United States Patent
Doyle et al.

(10) Patent No.: US 6,881,330 B2
(45) Date of Patent: Apr. 19, 2005

(54) MULTI-STAGE EDM FILTER

(75) Inventors: E. Michael Doyle, East Grand Rapids, MI (US); Edward M. Doyle, Bloomfield Hills, MI (US)

(73) Assignee: Hoff Engineering Co., Inc., Oxford, MI (US)

( * ) Notice: Subject to any disclaimer, the term of this patent is extended or adjusted under 35 U.S.C. 154(b) by 125 days.

(21) Appl. No.: 10/101,780

(22) Filed: Mar. 19, 2002

(65) Prior Publication Data

US 2003/0178351 A1 Sep. 25, 2003

(51) Int. Cl.⁷ .................... B01D 27/10; B01D 35/147
(52) U.S. Cl. .................. 210/132; 210/171; 210/337; 210/457; 210/487; 210/493.1
(58) Field of Search ................ 210/130, 132, 210/323, 2, 335, 337, 338, 342, 418, 457, 487, 493.1, 493.2, 137, 171; 55/309, 313, 482; 137/68.19, 68.21, 68.23, 68.11, 68.27; 219/69.14

(56) References Cited

U.S. PATENT DOCUMENTS

| | | | |
|---|---|---|---|
| 2,998,138 A | 8/1961 | Mould et al. ................. 210/90 |
| 3,317,046 A | * 5/1967 | Raupp et al. ................ 210/130 |
| 3,370,708 A | 2/1968 | Hultgren et al. ............ 210/130 |
| 3,476,256 A | 11/1969 | Anderson .................... 211/86 |
| 4,127,484 A | 11/1978 | Walulik et al. ............. 210/130 |
| 4,557,829 A | 12/1985 | Fields ......................... 210/132 |
| 5,198,107 A | * 3/1993 | Ponce ......................... 210/232 |
| 5,584,987 A | 12/1996 | Mules ......................... 210/130 |
| 5,690,816 A | 11/1997 | Covington ................... 210/130 |
| 6,063,276 A | * 5/2000 | Felber ......................... 210/315 |
| 6,096,199 A | 8/2000 | Covington ................... 210/130 |

* cited by examiner

*Primary Examiner*—Matthew O. Savage
(74) *Attorney, Agent, or Firm*—Gifford, Krass, Groh, Sprinkle, Anderson & Citkowski, PC

(57) ABSTRACT

A two-stage, retrofit filter is adapted for use with an electrical discharge machine (EDM) includes nested inner and outer filtering elements that may be placed as a unit in the same tank and over the apertured standpipe used for a one-stage filter, such that the fluid to be filtered now flows through each of the multiple filter elements. The retrofit EDM filter may be configured for flow in either direction, though the usual arrangement is one whereby the fluid being filtered flows up through the bottom of the tank, out the apertured standpipe, and into the inner filter element. Preferably, the filter elements are cylindrical, pleated elements composed of a technical grade filter paper. In the preferred embodiment, a pressure-operated release valve is provided in conjunction with the inner filter, such that when a predetermined pressure is reached due to the entrapment of contaminants by the inner filter, the valve opens to allow the fluid to be filtered to flow through the outer filter.

9 Claims, 5 Drawing Sheets

MULTI-STAGE EDM FILTER

FIELD OF THE INVENTION

This invention relates generally to filters and fluid control devices. More particularly, it relates to a retrofit filter for electrical discharge machines incorporating additional filtration elements.

BACKGROUND OF THE INVENTION

Spin-On Filters and EDM Filters

Prior art discloses various valves to direct the flow of dirty fluid inside a filter in a variety of applications including hydraulic, fuel, and engine lubrication systems. In automotive spin-on oil filters, for example, pressure relief valves are designed to provide circulating engine oil a by-pass route when the filter is restricted due to dirt accumulation or high oil viscosity because of a cold start in a winter climate. Some examples of known designs can be found in U.S. Pat. No. 4,127,484 (Walulik et al.), U.S. Pat. No. 5,584,987 (Mules), U.S. Pat. No. 5,690,816 (Covington), and U.S. Pat. No. 6,096,199 (Covington). These filters have the now familiar design of a casing enclosing a cylinder of filter media therein. Other previous designs include U.S. Pat. No. 2,998,138 (Mould et. al.) and U.S. Pat. No. 3,370,708 (Hultgren), these each incorporating a pair of concentric, cylindrical elements of filter media, this being a characteristic they share with the invention.

Various filters have been designed for the filtration requirements of EDMs (Electrical Discharge Machines). These machine tools require the filtration of large volumes of a high dielectric fluid, either dielectric oil or deionzed H20. The EDM filters discussed here are one component in a continuous loop EDM filtration system which includes a work table tank 31, a pump 33 to conduct the dirty work fluid from there to the filter 35, a clean side tank 37 or container to capture the clean filtrate, and a second pump 39 to bring the filtrate back to the work table area in order to repeat the cycle. The flow path of the EDM fluid in a typical EDM is shown schematically in FIG. 1.

Unlike the valves in spin-on oil filters, in an EDM filter valve there is no requirement for temperature sensitivity or an on-off feature. These circumstances present an opportunity for an EDM filter with an improved, more simple valving arrangement.

The invention does not include a spring in its design, such as in the spring-biased valves described in U.S. Pat. No. 4,557,829 (Fields) and U.S. Pat. No. 5,733,443 (Stamey et al.) or in the aforementioned U.S. Pat. No. 5,584,987 (Mules) and U.S. Pat. No. 3,370,708 (Hultgren). A valve utilizing a spring would be inherently more complicated than the invention. A spring in an EDM filter would require that its cross-section and materials of composition be considered. Changes in friction in the facing surface as the spring loads up need be engineered. Similarly, relief valve assemblies can be unduly complicated, require close assembly tolerances, and are not easily installed on filter assembly lines featuring rapidity without precise installation equipment.

The sludgy inside of a working EDM filter would be a challenging environment for any mechanical valving device. It is a commonplace of the EDM filter industry that a EDM filter's service life varies depending on the type of material being cut. The effect(s) of various kinds of dirt deriving from the commonly EDMed metals (tool steel, titanium, aluminum, copper, etc.) impinging on the spring's performance would have to be taken into consideration. In addition, an EDM filter sees internal pressure load changes as the EDM cycles or when the machine is turned off. The invention meets these challenges with a simple, elegant valving arrangement involving no moving parts. It is an object of the invention to provide an improved two stage liquid filter design wherein the disadvantages of prior filter constructions are obviated.

EDM Filters: Inside-Out Plumbing Arrangement

One EDM filter engineering approach employs a filter where the dirty fluid is routed inside-out, that is, into the interior of the filter by means of a conduit such as an inlet pipe with apertures that runs through the middle of the filter, this inlet pipe being part of the original equipment on the EDM, a sealed cylinder of filter medium through which the filtrate passes under pressure, and an external cylindrical cage to support the filter medium cylinder. A pleated filter medium cylinder 41 and an inlet standpipe with apertures 43 only are illustrated in FIG. 2. Note the inside-out flow path.

Because of the large amounts of metal sludge generated by late model EDMs, these inside-out filters tend to be large, often the size of an office waste paper basket, in order to collect as much sludge as possible between change-outs. As compared to the more common outside-in style filter, the inside-out filter offers the advantage of encapsulating almost all the metal sludge inside the filter at change-out.

The inside-out approach in an EDM filter offers the further advantage of a large internal volume that can be utilized for filtration purposes. It is the object of the invention to utilize this space more economically than heretofore.

An inner cylinder of pleated filter paper is sometimes included in these inside-out filters. Thus there are two concentric cylinders of pleated filter media. In this dual cylinder approach, the filtered fluid passes through the inner and outer cylinder simultaneously in FIG. 3. An increase of 40 percent in available overall filter surface area is typically obtained with a corresponding increase in the filter's useful life.

Re-plumbing an EDM's filtration system originally equipped with the single cylinder filter set-up to accept a dual cylinder filter is possible. However, the disadvantages of the dual cylinder approach, as currently designed, are the increased costs occurred in three areas:

1) the additional fixtures: a male plug 45 or nozzle on the filter itself, a female coupling device 47 on the hose, a hose clamp and hose 49, shown in FIG. 3.

2) a new filter tank or housing that accommodates the operator's need to access the coupling.

3) the additional facility space required for the plumbing fixtures and the change-out operation just mentioned The dual cylinder approach would become more attractive if it could be utilized in the existing EDM filter tank arrangements without radical re-plumbing. Our market research has shown the most EDM owners, faced with the effort and expense of re-plumbing their EDM, choose to not take advantage of the extra filter media that could be incorporated into an EDM filter's interior. Therefore, what is needed is a user-friendly, dual cylinder inside-out filter that utilizes the existing tank and plumbing fixtures. Preferably, this filter would be economical to produce and lend itself to high volume manufacturing operations.

SUMMARY OF THE INVENTION

The invention improves upon the existing art by providing a two-stage, retrofit filter adapted for use with EDMs of the type heretofore plumbed to accept only a single stage filter. The one-stage filter is placed in a tank over an apertured standpipe such that a fluid being filtered flows from the EDM's work table tank, through the apertured standpipe, and into the filter. In terms of construction, the inventive retrofit filter includes nested inner and outer filtering elements that may be placed as a unit in the same tank and over the same apertured standpipe used for the one-stage filter, but with the fluid to be filtered now flowing through the apertured standpipe and each of the filter elements.

Preferably, the filter elements are cylindrical, pleated elements composed of a technical grade filter paper, though alternative geometries and compositions are disclosed.

The flow though each of the nested elements may occur simultaneously or at different times. In the preferred embodiment, a pressure-operated valve is provided in conjunction with the inner filter, such that when a predetermined pressure is reached due to the entrapment of contaminants by the inner filter, the valve opens to allow the fluid to be filtered to flow through the outer filter. When a pleated inner filter element is used, the pleatings may be reinforced at least in the vicinity of the pressure-operated release valve to ensure that the pleatings do not interfere with the opening or flow through the valve.

According to an alternative embodiment, a pressure-operated arrangement is provided whereby the inner filter element moves relative to the outer filter element when a predetermined pressure is reached due to the entrapment of contaminants by the inner filter, thereby allowing the fluid to be filtered to flow past the inner filter and through the outer filter. As a further alternative, the construction of the inner filter element may be such that it tears, decomposes, or disintegrates when a predetermined pressure is reached due to the entrapment of contaminants by the inner filter, thereby allowing the fluid to be filtered to flow past or through the inner filter and through the outer filter.

In configurations wherein the fluid to be filtered flows through the filter elements at substantially the same time, the construction or composition of the elements may be such that the fluid is filtered at a lesser efficiency by the inner element, then filtered at a greater efficiency by the outer element.

The advantages of the invention include an increase in an EDM filter's useful service life, achieved by utilizing the available internal volume of commonly used EDM filters. No filter of larger cubic footage is required. The concept incorporates the advantages of the externally plumbed EDM inside-out filters without disturbing the existent plumbing and tank arrangements, thus avoiding the extra costs associated with plumbing fixtures external to the filter. The extra filter service life occurs in a consistent and reproducible manner, and the design of the valving device is simple, straight forward, and easy to manufacture.

DETAIL DESCRIPTION OF THE INVENTION

Figure 1:
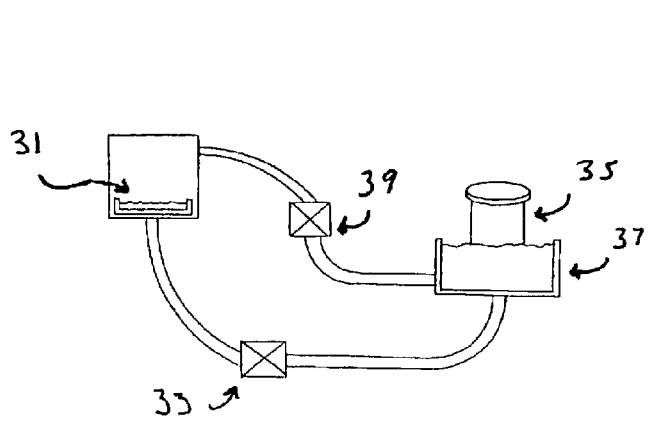
FIG. 1 is a schematic view of typical continuous loop EDM filtration system.
Figure 2:
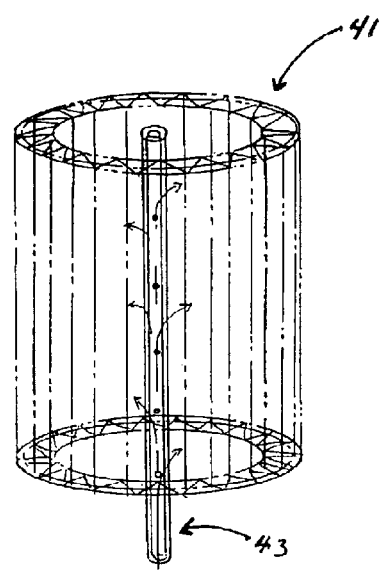
FIG. 2 illustrates a prior art single cylinder EDM filter without its end caps, showing the inlet pipe with apertures.

For the purpose of understanding the invention, reference will now be made to the embodiment illustrated in the drawings. It should be understood that no limitations of the invention's scope is thereby intended. The specification relates primarily to filtering the common conductive EDM fluids deionized water and dielectric oil but its principles could be extended to include other flowable substance including, but not limited to, machining fluids, coolants, other industrial and process fluids, as well as air, gases, and vapors. Further applications of the principles of the invention as illustrated would normally occur to one skilled in the art to which the invention relates.

Figure 3:
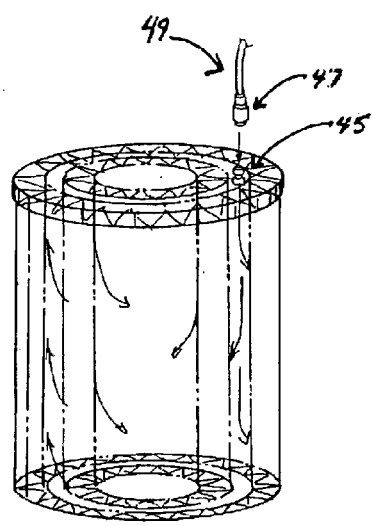
FIG. 3 illustrates a prior art dual cylinder EDM filter, showing external plumbing fixtures.

The design of a common, commercially available EDM filter was illustrated previously in FIG. 3. This filter has two concentric cylinders of pleated filter paper intended to filter the dirty fluid in the inside-out plumbing configuration. It is the more economical incorporation of the inner cylinder, with the corresponding increase in the filter's useful life, which is the object of the invention.

Figure 4:
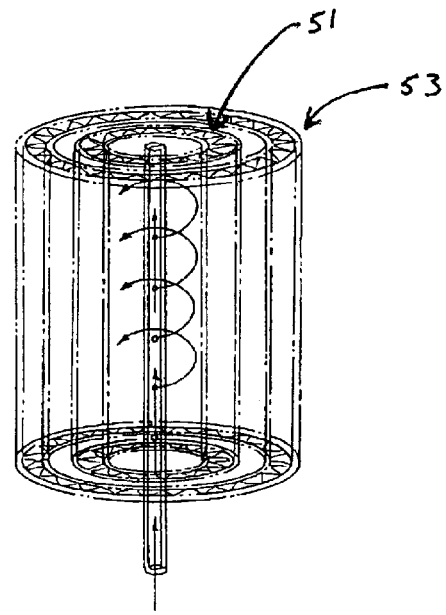
FIG. 4 shows a flowpath of dirty fluid before filtration has occurred, according to the present invention.
Figure 5:
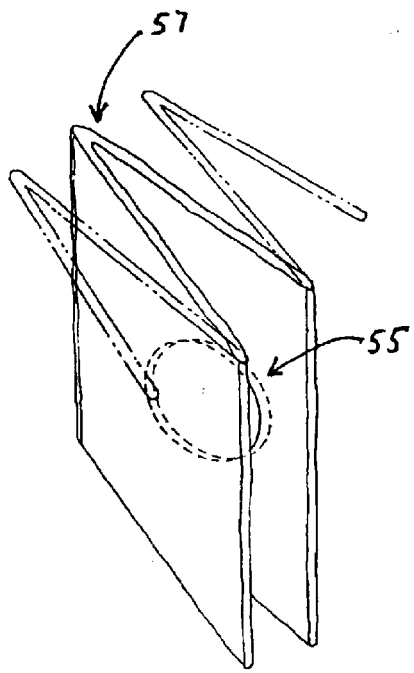
FIG. 5 is an aperture in the pleatings through which dirty fluid flows, in close-up view.
Figure 6:
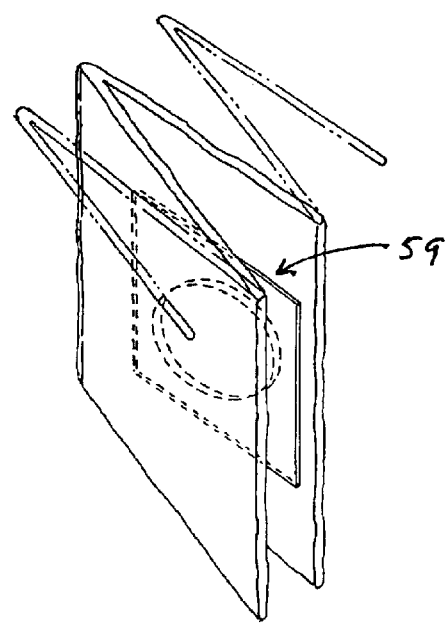
FIG. 6 shows a reproducibly rupturable diaphragm (RRD) in place over the aperture.

The flow path of the dirty machining fluid before filtration has occurred in an EDM filter is shown, according to the present invention, in FIG. 4. The dirty fluid will have to pass first through the inner cylinder of filter medium 51, and then, once filtered, subsequently through the outer cylinder 53. The aperture 55 or opening in a pleat 57 the filter medium cylinder through which the dirty fluid will flow when the invention functions is shown in close-up in FIG. 5. This aperture 55 is made in the second leg of the upstream pleat. A section of material of pre-determined burst strength—hereafter termed the Reproducibly Rupturable Diaphram (RRD) 59—covers the aperture 55 in FIG. 6. It is held in place by a bonding agent or glue.

Figure 7:
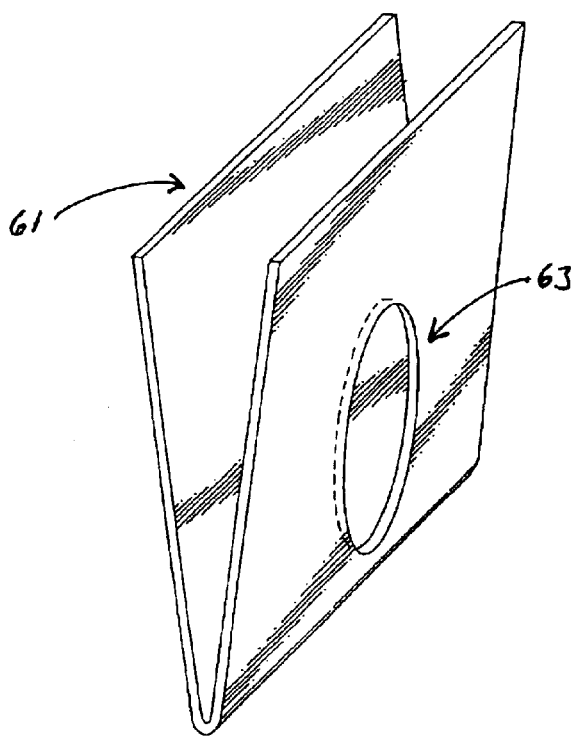
FIG. 7 shows an upstream brace with an opening.
Figure 8:
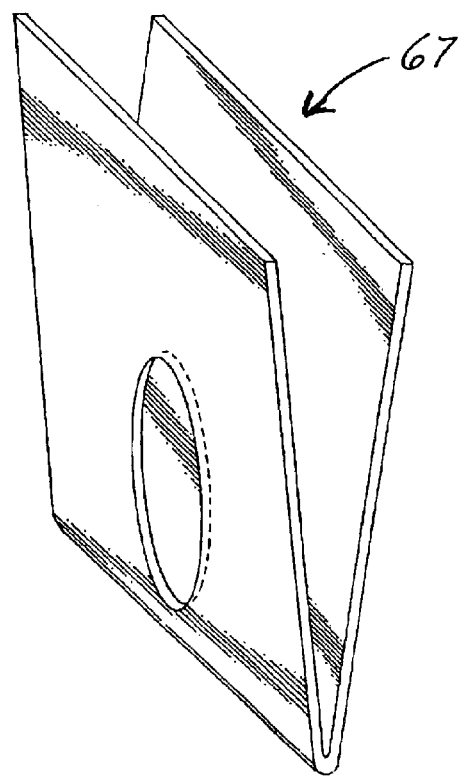
FIG. 8 shows a downstream brace with an opening.

A brace 61 or support with an opening 63 matched to the aperture 55 is shown in FIG. 7. It must be attached to the upstream side to separate the adjoining pleat 65 of flexible paper medium and keep it from being pushed under pressure onto the aperture and sealing it prematurely. A second brace 67, illustrated in FIG. 8, has been shown to be necessary to be attached to the downstream side to prevent the paper filter media from being sucked back into the opening as the filter pump goes off and on during the EDM's normal machine cycles.

Figure 9:
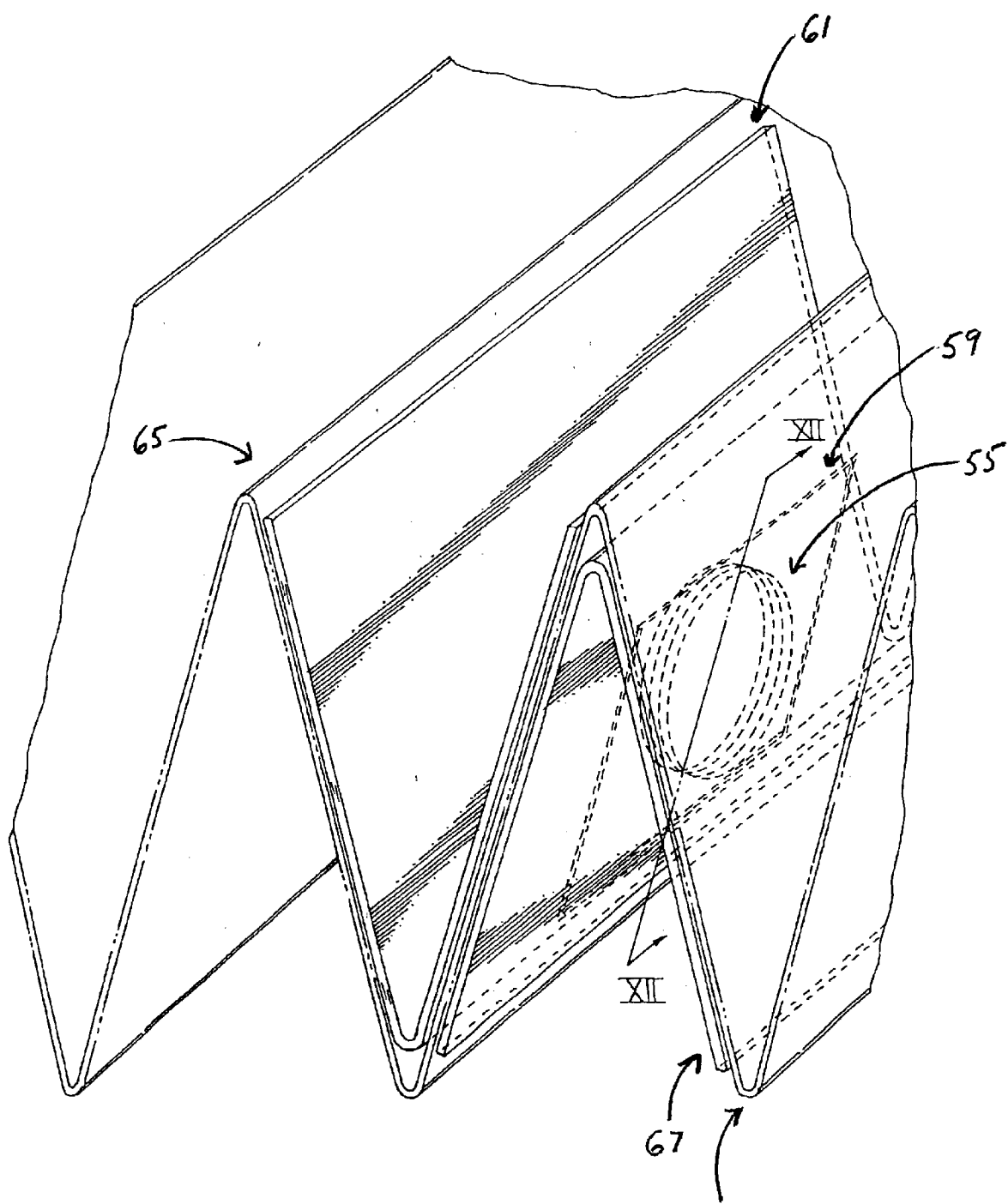
FIG. 9 illustrates parts of complete valving assembly.

The complete valving arrangement FIG. 9 involves, then, proceeding from the upstream side: a) adjoining upstream pleat 65, b) bonding agent, c) first brace with opening 61, d) section of material of pre-determined burst strength, or RRD 59, e) bonding agent, f) aperture in the second leg of the upstream pleat 55, g) bonding agent, h) second brace with opening 67, i) adjoining downstream pleat 69.

A Specific Preferred Embodiment

It should be understood that a wide variety of specific configurations in other filter applications are feasible, utilizing the techniques of the invention. The particulars of the fluid filter arrangement in this specific embodiment only will now be described.

Figure 10:
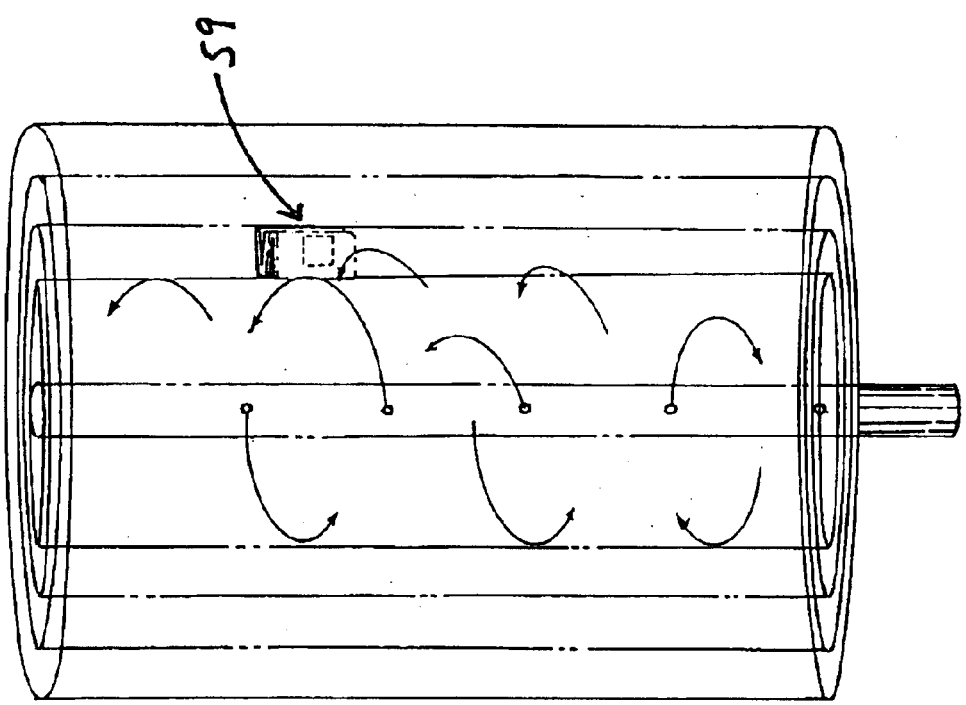
FIG. 10 shows a valving device in place, serving as obturator.

In the preferred embodiment, the aperture has a diameter of 0.800", a diameter engineered to meet two requirements: an opening large enough to accommodate the normal 20 lpm flow of typical EDMs, and two, small enough that the RRD 59 can be supported by the adjoining filter paper and does not open prematurely. FIG. 10 shows the RRD 59—which in the preferred embodiment is aluminum foil of 0.001 inch thickness—in place covering the aperture 55 in the media. The bonding agent in this embodiment is hot polyethylene glue.

Figure 11:
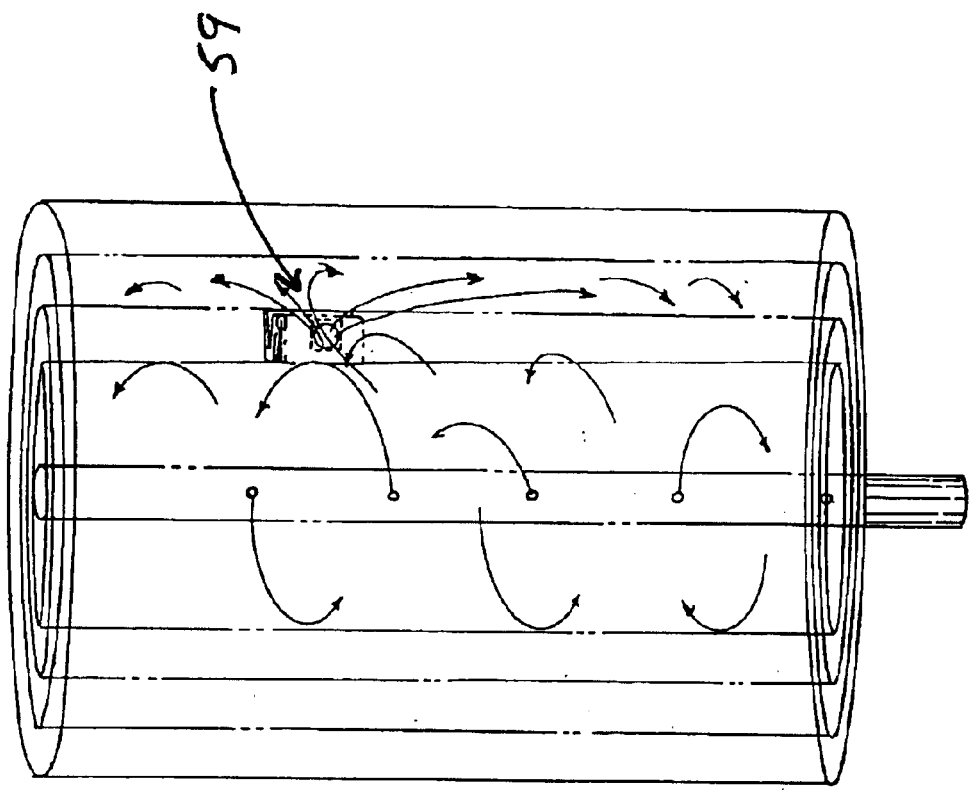
FIG. 11 shows a valving device in place, directing flow of dirty fluid into outer chamber.

In the preferred embodiment, the brace(s) is made of sheet metal. It is stamped, formed, and drilled in a manner such that provides a sealing surface for the bonding agent to adhere it to the adjoining pleat, and such that it functions as a spacer restraining the opposite pleat. These two braces function as spacers, the upstream one to prevent the RRD 59 from never having a chance to rupture at all FIG. 10, the downstream one to preserve the flow path once the RRD 59 has ruptured FIG. 11.

Operation

Figure 12:
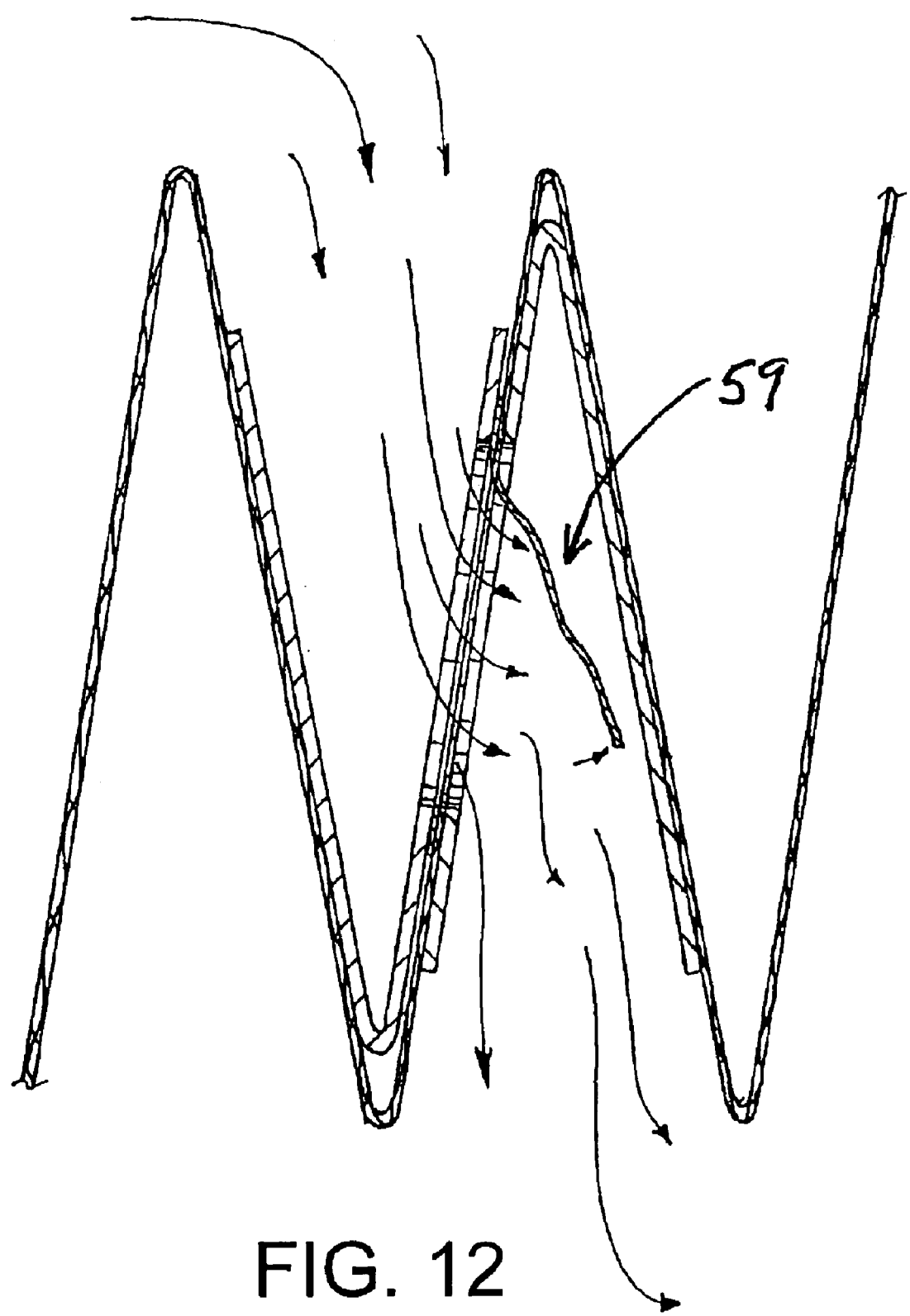
FIG. 12 shows a ruptured RRD, in close-up.

The manner of using an EDM filter incorporating the invention is identical to the common method of employing the inside-out style of EDM filter, the solitary difference being the increase in filter service life realized. Dirty fluid is pumped under pressure from the EDM's work table to an inlet pipe with apertures 43 passing into the interior of the filter FIG. 10. Until a pre-determined PSID—26 PSID in this embodiment—is reached inside the inner chamber, the RRD 59 acts as an obturator or blocker and does not permit the dirty fluid to pass into outer chamber without first being filtered by the inner cylinder. Although dirt begins to clog the inner cylinder causing the PSID to rise, the fluid that reaches the outer cylinder is still clean and filtered. When restriction across the inner cylinder reaches the predetermined PSID, the RRD 59 ruptures FIG. 11, providing an alternative route for the dirty fluid to follow into contact with the outer cylinder. The ruptured RRD 59 is shown in close-up in FIG. 12. The outer cylinder can then begin its filtering function.

Thus the reader will see that the invention provides an easy to manufacture valving device which permits the more economical utilization of the internal volume of an EDM filter. The invention achieves the objective of increasing an EDM filter's service life, while eliminating the difficulties encountered in the use of prior devices.

The essence of the invention is a design approach where a second filter is integrated into a filter and increases its overall service life in a manner that obviates the need for further external plumbing. Although the description above contains specificities, these should not be construed as limiting the scope of the invention but as merely providing an illustration of the presently preferred embodiment. Other applications of the principles of the invention would normally occur to one skilled in the art to which the invention relates. For example, The flow path could be outside-in rather than inside-out, with the valve being incorporated into the outer cylinder.

The RRD could be made from other materials, and have other thicknesses or shapes. The RRD could be embedded in other, non-pleated filter media such as felt or solid fiber tubes.

The braces could be shown to be unnecessary, if an economical media had sufficient column strength that it did not collapse onto the RRD's aperture.

Other valve designs:
displacement of the internal filter cylinder from the end cap under pressure to upset the seal and provide bypass.
a tear or slit opening in the internal cylinder under pressure, or an unlatching of the longitudinal seam under pressure.
pressure relief valve(s)

Function accomplished without any valve at all:
disintegration of the entire internal cylinder, by design, at a predetermined PSID.
sizing of the aperture in the internal cylinder for predetermined proportioning of the flow rate. Orifice selection only provides desired flow, at essentially one flow rate only, hence no valve.

The composition and filtration efficiencies of the filter cylinders, especially that of the second outer cylinder, could be adjusted to provide progressively finer filtration.

Thus the scope of the invention should be apprehended by the appended claims and their legal equivalents, rather than by the examples given.

We claim:

1. A two-stage retrofit filter adapted for use with an electrical discharge machine (EDM) of the type wherein a one-stage filter is placed in a tank over an apertured standpipe such that a fluid being filtered flows through the apertured standpipe and filter, the retrofit EDM filter comprising:

a plurality of nested filter elements, including an inner element and an outer element, the physical configuration of the elements being such that the retrofit filter may be placed in the same tank and over the apertured standpipe used for the one-stage filter, so that the fluid to be filtered flows through the apertured standpipe and each of the filter elements;

an aperture extending through the inner filter from an upstream side to a downstream side of the inner filter; and a reproducibly rupturable diaphragm covering the aperture, the diaphragm being designed to rupture when subjected to a predetermined pressure.

2. The retrofit EDM filter of claim 1, wherein the fluid being filtered flows from the EDM work table tank to the apertured standpipe, and into the inner filter element.

3. The retrofit EDM filter of claim 1, wherein the filter elements are cylindrical.

4. The retrofit EDM filter of claim 1, wherein the filter elements are pleated.

5. The retrofit EDM filter of claim 1, wherein the filter elements are composed of filter paper.

6. The retrofit EDM filter of claim 1, wherein:

at least the inner filter element is pleated; and the pleatings are reinforced at least in the vicinity of the pressure-operated release valve to ensure that the pleatings do not interfere with the opening or flow through the valve.

7. A two-stage retrofit filter adapted for use with an electrical discharge machine (EDM) of the type wherein a one-stage filter is placed in a tank over an central, apertured standpipe, such that a fluid to be filtered flows up through the bottom of the tank, out the apertured standpipe, and into the filter, the retrofit EDM filter comprising:

a plurality of nested cylindrical pleated filter elements, including an inner element and an outer element, the physical configuration of the elements being such that the retrofit filter may be placed in the same tank and over the apertured standpipe used for the one-stage filter, so that the fluid to be filtered now flows through the apertured standpipe and each of the filter elements;

an aperture extending through the inner filter from an upstream side to a downstream side of the inner filter; and a reproducibly rupturable diaphragm covering the aperture, the diaphragm being designed to rupture when subjected to a predetermined pressure.

8. The retrofit EDM filter of claim 7, wherein the filter elements are composed of filter paper.

9. The retrofit EDM filter of claim 7, wherein:

the pleatings are reinforced at least in the vicinity of the pressure-operated release valve to ensure that the pleatings do not interfere with the opening or flow through the valve.

* * * * *